US012783623B2

(12) United States Patent
Kato et al.

(10) Patent No.: US 12,783,623 B2
(45) Date of Patent: Nov. 3, 2026

(54) INFORMATION PROCESSING APPARATUS, INFORMATION PROCESSING METHOD, AND STORAGE MEDIUM

(71) Applicant: NEC Corporation, Tokyo (JP)

(72) Inventors: Sanae Kato, Tokyo (JP); Junichi Kumazaki, Tokyo (JP); Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/381,382

(22) Filed: Oct. 18, 2023

(65) Prior Publication Data

US 2024/0045937 A1 Feb. 8, 2024

Related U.S. Application Data

(63) Continuation of application No. 17/227,707, filed on Apr. 12, 2021, now abandoned, which is a continuation of application No. 16/388,239, filed on Apr. 18, 2019, now abandoned, which is a
(Continued)

(51) Int. Cl.

| | |
|---|---|
| ***G06F 21/32*** | (2013.01) |
| ***G06F 18/22*** | (2023.01) |
| ***G06V 20/64*** | (2022.01) |
| ***G06V 40/16*** | (2022.01) |
| ***G06V 40/20*** | (2022.01) |

(Continued)

(52) U.S. Cl.
CPC .............. *G06F 21/32* (2013.01); *G06F 18/22* (2023.01); *G06V 20/64* (2022.01); *G06V 40/172* (2022.01); *G06V 40/20* (2022.01); *G06V 40/45* (2022.01); *G06V 40/67* (2022.01)

(58) Field of Classification Search
CPC ......... G06F 21/32; G06F 18/22; G06V 20/64; G06V 40/172; G06V 40/20; G06V 40/45; G06V 40/67
See application file for complete search history.

(56) References Cited

U.S. PATENT DOCUMENTS 8,254,647 B1 * 8/2012 Nechyba .............. G06V 40/165 382/118
8,290,220 B2 * 10/2012 Uchida .................. G06F 21/32 382/118
(Continued)

FOREIGN PATENT DOCUMENTS

CN 107066983 A 8/2017
EP 1990770 A1 11/2008
(Continued)

OTHER PUBLICATIONS

JP Office Action for JP Application No. 2023-022081, mailed on Dec. 19, 2023 with English Translation.
(Continued)

*Primary Examiner* — Sharon S Lynch
(74) *Attorney, Agent, or Firm* — Sughrue Mion, PLLC

(57) ABSTRACT

An information processing apparatus includes: a movement instruction unit that instructs a user about a movement; an information acquisition unit that acquires biometrics information on the user from the user instructed about the movement; and a display control unit that controls display directed to the user in accordance with the movement status of the user.

21 Claims, 12 Drawing Sheets

Related U.S. Application Data continuation of application No. PCT/JP2018/041060, filed on Nov. 5, 2018.

(51) Int. Cl.
*G06V 40/40* (2022.01)
*G06V 40/60* (2022.01)

(56) References Cited

U.S. PATENT DOCUMENTS 8,441,548 B1 * 5/2013 Nechyba ............... G06T 7/0002
348/222.1
8,457,367 B1 * 6/2013 Sipe ........................ G06F 21/32
382/118
8,514,240 B2 * 8/2013 Suzuki .................. G06V 40/67
345/589
8,542,879 B1 * 9/2013 Nechyba ............. G06V 40/171
382/118
8,582,835 B2 * 11/2013 Cavallini ............ G06V 10/806
382/118
9,025,830 B2 * 5/2015 Ma ........................ G06V 40/16
382/107
9,117,109 B2 * 8/2015 Nechyba ............. G06V 40/176
9,202,121 B2 * 12/2015 Cavallini ............ G06V 40/167
9,251,401 B1 * 2/2016 Koo ....................... G06V 40/67
9,444,924 B2 * 9/2016 Rodriguez ............ G01C 21/20
9,449,217 B1 * 9/2016 Bourlai ............... G06V 30/142
9,619,723 B1 * 4/2017 Chow .................... G06V 40/45
9,652,663 B2 * 5/2017 Lau ...................... G06V 40/168
9,672,415 B2 * 6/2017 Pfursich .............. G06V 40/161
9,875,396 B2 * 1/2018 Negi .................... G06V 40/174
9,934,443 B2 * 4/2018 Sezille .................... G06F 21/32
9,953,149 B2 * 4/2018 Tussy ................. G06Q 20/3276
10,262,204 B2 * 4/2019 Son ........................ H04N 23/61
10,305,895 B2 * 5/2019 Barry ..................... G07C 9/257
10,339,367 B2 * 7/2019 Eder .................... G06V 40/172
10,360,442 B2 * 7/2019 Negi ...................... G06V 40/40
10,395,128 B2 * 8/2019 Van Os .................. G06V 10/17
10,402,553 B1 * 9/2019 Johnson ................. G06V 40/20
10,410,076 B2 * 9/2019 Van Os ................. G06V 10/242
10,430,679 B2 * 10/2019 Sezille ................ H04L 63/0861
10,438,077 B2 * 10/2019 Wang ................... G06V 40/166
10,521,579 B2 * 12/2019 Van Os ................. G06F 1/1686
10,628,670 B2 * 4/2020 Son ........................ H04N 23/61
10,679,083 B2 * 6/2020 Xu ....................... G06V 40/172
10,706,269 B2 * 7/2020 Eder .................... G06V 40/171
10,783,227 B2 * 9/2020 Van Os .................. G06V 40/13
10,796,178 B2 * 10/2020 Fan ...................... G06V 10/141
10,853,625 B2 * 12/2020 McCombe ........... G06V 20/647
10,863,056 B2 * 12/2020 Sakashita ............... G06V 40/28
10,872,256 B2 * 12/2020 Van Os ................... G06F 3/016
11,386,189 B2 * 7/2022 Van Os ............... G06F 3/04883
11,393,258 B2 * 7/2022 Van Os ................. G06F 3/0488
11,425,562 B2 * 8/2022 LeCun ................. H04N 19/184
11,501,566 B2 * 11/2022 Ranganath ............. G06V 10/76
11,765,163 B2 * 9/2023 Van Os ................. G06F 3/0488
340/5.83
12,462,005 B2 * 11/2025 Van Os .................. G06V 40/13
2005/0212654 A1 * 9/2005 Yoda ........................ G07C 9/38
340/5.2
2006/0126905 A1 * 6/2006 Loo ...................... G06V 40/166
382/118
2008/0192980 A1 * 8/2008 Park ......................... G07C 9/37
382/103
2009/0135188 A1 * 5/2009 Ding ...................... G06V 40/40
345/473
2012/0299949 A1 * 11/2012 Suzuki ................... G06V 40/67
345/591
2013/0015946 A1 * 1/2013 Lau ...................... G06V 40/172
340/5.2
2013/0016882 A1 * 1/2013 Cavallini ............. G06V 40/172
382/117
2014/0016837 A1 * 1/2014 Nechyba ................ G06V 40/45
382/118
2014/0150091 A1 * 5/2014 Hicks .................. H04L 63/0861
726/19
2014/0270412 A1 * 9/2014 Ma ......................... G06V 40/16
382/118
2014/0307929 A1 * 10/2014 Nechyba ............. G06V 40/171
382/118
2014/0337930 A1 * 11/2014 Hoyos ..................... G06F 21/34
726/4
2015/0154392 A1 * 6/2015 Bao ......................... G06F 21/36
726/19
2015/0281673 A1 10/2015 Didier
2015/0310259 A1 * 10/2015 Lau ...................... G06V 40/169
382/118
2015/0334567 A1 11/2015 Chen et al.
2016/0063235 A1 * 3/2016 Tussy ..................... G06V 40/67
726/6
2016/0063314 A1 * 3/2016 Samet ..................... G06F 21/31
348/78
2016/0307030 A1 * 10/2016 Samet ...................... G07C 9/00
2016/0308859 A1 * 10/2016 Barry ....................... G07C 9/22
2016/0335483 A1 * 11/2016 Pfursich ............... G06V 40/174
2016/0342851 A1 * 11/2016 Holz ...................... G06V 40/70
2016/0366129 A1 * 12/2016 Chen ...................... G06V 40/67
2017/0053174 A1 * 2/2017 Fan ........................ G06V 40/40
2017/0124312 A1 * 5/2017 Inoue ........................ H04L 9/32
2017/0193285 A1 * 7/2017 Negi .................... G06V 40/172
2017/0286754 A1 * 10/2017 Eder .................... G06V 40/172
2017/0344793 A1 * 11/2017 Xue ..................... H04N 23/611
2018/0032828 A1 * 2/2018 Wang ................... G06V 40/166
2018/0046850 A1 * 2/2018 Ionita ..................... G06V 10/17
2018/0046852 A1 * 2/2018 Ionita .................. G06V 40/167
2018/0046853 A1 * 2/2018 Ionita ...................... G06F 18/22
2018/0048645 A1 * 2/2018 Ionita .................. G06V 40/172
2018/0101721 A1 * 4/2018 Nienhouse ........... B60K 28/063
2018/0173980 A1 * 6/2018 Fan ........................ G06V 40/45
2018/0181737 A1 * 6/2018 Tussy ...................... G06F 21/32
2018/0189550 A1 * 7/2018 McCombe ........... G06V 40/166
2018/0189960 A1 * 7/2018 Martin ................. G06V 30/142
2018/0211096 A1 * 7/2018 Cao ...................... G06V 40/171
2018/0232739 A1 * 8/2018 Battle ................ G06Q 20/0655
2018/0349682 A1 * 12/2018 Wong ................... G06V 40/172
2018/0373923 A1 * 12/2018 Negi .................... G06V 40/174
2019/0080066 A1 * 3/2019 Van Os .................. G06V 40/16
2019/0080070 A1 * 3/2019 Van Os ................ H04L 9/3231
2019/0080071 A1 * 3/2019 Van Os ................ H04L 9/3231
2019/0080072 A1 * 3/2019 Van Os ................... G06F 3/016
2019/0080189 A1 * 3/2019 Van Os .................. H04N 23/62
2019/0272413 A1 * 9/2019 Eder ...................... H04N 23/63
2019/0281187 A1 * 9/2019 Sakashita ............... G06V 40/28
2019/0311101 A1 * 10/2019 Nienhouse ........... A61B 5/1176
2019/0370583 A1 * 12/2019 Van Os ................ H04N 23/611
2020/0026906 A1 1/2020 Ajiki et al.
2020/0042682 A1 * 2/2020 Johnson ............... G06V 40/172
2020/0242341 A1 * 7/2020 Ranganath ........... G06V 40/172
2021/0042549 A1 * 2/2021 Van Os ............... H04L 63/0861
2021/0264184 A1 * 8/2021 Aoyagi .................. G06V 40/45
2022/0342972 A1 * 10/2022 Van Os ............... G06F 3/04847
2022/0351549 A1 * 11/2022 Van Os .................. G06V 10/98
2022/0398591 A1 * 12/2022 Battle ........................ H04L 9/50
2024/0420142 A1 * 12/2024 Battle ................ G06Q 20/0655

FOREIGN PATENT DOCUMENTS

JP 2000-287223 A 10/2000
JP 2003-141541 A 5/2003
JP 2003-178306 A 6/2003
JP 2003-317100 A 11/2003
JP 2004-362079 A 12/2004
JP 2007-304801 A 11/2007
JP 2009-187242 A 8/2009
JP 2010-218039 A 9/2010
JP 2012-200023 A 10/2012
JP 2014-115821 A 6/2014
JP 2015-090662 A 5/2015
JP 2015-533432 A 11/2015
JP 2017-016192 A 1/2017
JP 2018-061540 A 4/2018
JP 2019-212156 A 12/2019

(56) References Cited

FOREIGN PATENT DOCUMENTS

| | | | |
|---|---|---|---|
| JP | 2020-525868 | A | 8/2020 |
| WO | 2010/050206 | A1 | 5/2010 |
| WO | 2010/137157 | A1 | 12/2010 |
| WO | 2015/194135 | A1 | 12/2015 |
| WO | 2017/078627 | A1 | 5/2017 |
| WO | 2017/170384 | A1 | 10/2017 |
| WO | 2018/181819 | A1 | 10/2018 |
| WO | 2018/226265 | A1 | 12/2018 |

OTHER PUBLICATIONS

International Search Report for PCT/JP2018/041060 dated Dec. 25, 2018 [PCT/ISA/210].
Search Query Report from IP.com (performed Jun. 22, 2020).
Search Query Report from IP.com (performed Mar. 4, 2021) (Year: 2021).
Extended European Search Report for EP Application No. EP18939355.6 dated on Oct. 1, 2021.
US Office Action for U.S. Appl. No. 16/388,239 mailed on Nov. 24, 2021.
Search Query Report from IP.com (performed Nov. 19, 2021).
US Office Action for U.S. Appl. No. 16/388,239 mailed on May 20, 2022.
Search Query Report from IP.com (performed May 18, 2022).
Japanese Office Action for JP Application No. 2020-556377 mailed on Nov. 17, 2022 with English Translation.
Setting of the Touch ID (fingerprint authentication) of the iPhone, release of the lock, and web archive in the world National Diet Library's Internet material collection, [Nov. 9, 2022 search on Jan. 28, 2018, pp. 1/10-5/10 , Internet< URL: https://web.archive.org/web/20180728043030/https://iphone. f -, and the Internet 07 Tools. net/setting/Shimon - Ninsyou - Touch-ID. html> Cited in JPOA.
Singapore Office Communication for SG Application No. 11202104685W mailed on Nov. 30, 2022.
Search Query Report from IP.com (performed Nov. 18, 2022) (Year: 2022).
Japanese Office Action for JP Application No. 2024-080580 mailed on Mar. 18, 2025 with English Translation.
JP Office Action for JP Application No. 2024-080580, mailed on Jun. 10, 2025 with English Translation.
Japanese Office Action for JP Application No. 2025-142893, mailed on May 19, 2026 with English Translation.

* cited by examiner

INFORMATION PROCESSING APPARATUS, INFORMATION PROCESSING METHOD, AND STORAGE MEDIUM

CROSS-REFERENCE TO RELATED APPLICATIONS

This application is a Continuation of U.S. application Ser. No. 17/227,707, filed Apr. 12, 2021, which is a Continuation of U.S. application Ser. No. 16/388,239, filed Apr. 18, 2019, which is a Continuation of International Application No. PCT/JP2018/041060, filed Nov. 5, 2018. The entire contents of the above-referenced application are expressly incorporated herein by reference.

TECHNICAL FIELD

The present invention relates to an information processing apparatus, an information processing method, and a storage medium.

BACKGROUND ART

International Publication No. WO 2015/194135 discloses an authentication apparatus that checks reality to see if a user is a human or not. The authentication apparatus disclosed in International Publication No. WO 2015/194135 checks reality of a user by determining whether or not a response to a challenge is correct that is information based on which the user to be authenticated inputs information used for an authentication process.

SUMMARY

When it is determined whether or not there is impersonation by using a photograph or the like based on a user's movement in accordance with a particular instruction such as a challenge as with the art disclosed in International Publication No. WO 2015/194135, the user may be unable to move properly in accordance with the particular instruction. Thus, in the art disclosed in International Publication No. WO 2015/194135, it may be difficult to suitably collect necessary information based on the user's movement.

In view of the problem described above, an example object of the present invention is to provide an information processing apparatus, an information processing method, and a storage medium that can suitably acquire necessary biometrics information based on a user's movement.

According to one example aspect of the present invention, provided is an information processing apparatus including: a movement instruction unit that instructs a user about a movement; an information acquisition unit that acquires biometrics information on the user from the user instructed about the movement; and a display control unit that controls display directed to the user in accordance with a movement status of the user.

According to another example aspect of the present invention, provided is an information processing method including: instructing a user about a movement; acquiring biometrics information on the user from the user instructed about the movement; and controlling display directed to the user in accordance with a movement status of the user.

According to yet another example aspect of the present invention, provided is a non-transitory storage medium storing a program that causes a computer to perform: instructing a user about a movement; acquiring biometrics information on the user from the user instructed about the movement; and controlling display directed to the user in accordance with a movement status of the user.

EXAMPLE EMBODIMENT

First Example Embodiment

An information processing apparatus and an information processing method according to a first example embodiment of the present invention will be described by using FIG. 1 to FIG. 10.

Figure 1:
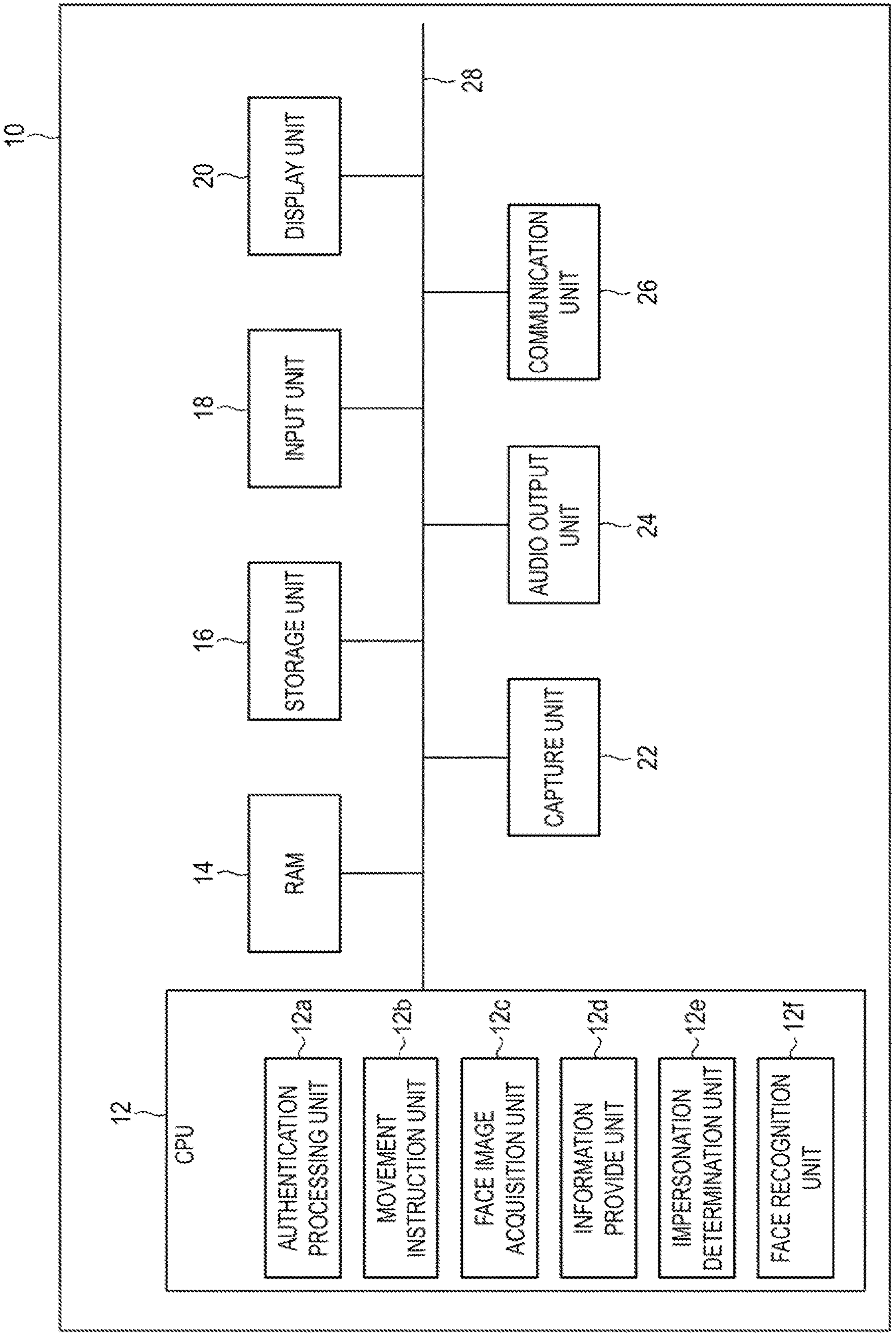
FIG. 1 is a block diagram illustrating a configuration of an information processing apparatus according to a first example embodiment of the present invention.

First, the configuration of the information processing apparatus according to the present example embodiment will be described by using FIG. 1. FIG. 1 is a block diagram illustrating the configuration of the information processing apparatus according to the present example embodiment.

As illustrated in FIG. 1, an information processing apparatus 10 according to the present example embodiment has a central processing unit (CPU) 12, a random access memory (RAM) 14, a storage unit 16, an input unit 18, a display unit 20, a capture unit 22, an audio output unit 24, and a communication unit 26. The CPU 12, the RAM 14, the storage unit 16, the input unit 18, the display unit 20, the capture unit 22, the audio output unit 24, and the communication unit 26 are connected to a common bus 28.

The information processing apparatus 10 is a smartphone, for example, while not particularly limited. The information processing apparatus 10 may be a tablet type personal computer, a mobile phone, or the like. Further, the information processing apparatus 10 may be a computer apparatus such as a laptop personal computer, a desktop personal computer, or the like, for example. The information processing apparatus 10 can execute various application programs in accordance with an execution instruction from a user using the same.

The CPU 12 operates by executing a program stored in the storage unit 16 and functions as a control unit that controls the operation of the entire information processing apparatus 10. Further, the CPU 12 performs various processes as the information processing apparatus 10 by executing a program stored in the storage unit 16. The RAM 14 provides a memory field necessary for the operation of the CPU 12.

The information processing apparatus 10 according to the present example embodiment performs face authentication for a user when the user logs in a particular application program stored in the storage unit 16. Furthermore, the information processing apparatus 10 is configured to be able to determine impersonation of the user by using a non-living object such as a photograph, a moving image, or the like in face authentication.

Note that the information processing apparatus 10 can also perform the same face authentication at various timings other than at login to a particular application program. For example, the information processing apparatus 10 can also perform the same face authentication for the user at the start of a use of the information processing apparatus 10, such as at system startup or at unlocking of the information processing apparatus 10. Further, for example, the information processing apparatus 10 can also perform the same face authentication for the user at the start of access to a particular resource such as a particular file, a particular directory, a particular folder, or the like stored in the storage unit 16 or the like. In such a way, the information processing apparatus 10 can be configured to perform face authentication at the start of a particular process for the user who requests that process.

The CPU 12 functions as each of the following function units used for face authentication for the user by executing a particular application program stored in the storage unit 16. That is, the CPU 12 functions as an authentication processing unit 12*a*, a movement instruction unit 12*b*, a face image acquisition unit 12*c*, an information provide unit 12*d*, an impersonation determination unit 12*e*, and a face recognition unit 12*f*.

The authentication processing unit 12*a* causes the display unit 20 to display a login window that requests the user for face authentication and accepts a login request from the user. For example, the user who is a target of face authentication is able to perform touch entry by pushing a particular region such as a login button, a login icon, or the like in a login window displayed on the display unit 20, which is configured integrally with the input unit 18 as a touchscreen display. This enables the user to input a login request to the information processing apparatus 10. Further, the user is able to input a login request to the information processing apparatus 10 by causing the capture unit 22 to capture its own face and inputting the face image to the information processing apparatus 10, for example. Once a login request is input by the user, the authentication processing unit 12*a* causes the display unit 20 to display a face authentication window used for face authentication.

Further, the authentication processing unit 12*a* performs face authentication as authentication for the user based on a result of impersonation determination performed by the impersonation determination unit 12*e* and a result of face recognition performed by the face recognition unit 12*f*. That is, the authentication processing unit 12*a* determines whether or not face authentication of the user is successful based on a result of impersonation determination and a result of face recognition and performs a process in accordance with the determination results.

The authentication processing unit 12*a* determines that the face authentication of the user is successful when it is determined by the impersonation determination unit 12*e* that there is no impersonation and it is determined by the face recognition unit 12*f* that there is a matching in face recognition, as described later. In response to determining that face authentication of the user is successful, the authentication processing unit 12*a* permits login of the user to a particular application program and performs a login process for allowing the user to log in.

On the other hand, when it is determined by the impersonation determination unit 12*e* that there is impersonation or when it is determined by the face recognition unit 12*f* that there is no matching in face authentication, the authentication processing unit 12*a* determines that the face authentication of the user is unsuccessful, that is, the face authentication of the user failed. In response to determining that the face authentication of the user failed, the authentication processing unit 12*a* denies login of the user to the application program. In this case, the authentication processing unit 12*a* can perform a failure process such as a process of notifying the user that face authentication failed. For example, the authentication processing unit 12*a* can display the display indicating that face authentication failed on the display unit 20 and perform notification.

In response to receiving entry of a login request from the user, the movement instruction unit 12*b* instructs the user, who is a target of face authentication, to perform a particular movement regarding the head captured by a capture unit 22. The movement instruction unit 12*b* can cause the display unit 20 to display the display providing an instruction about a particular movement and instruct the user about the particular movement. The movement instruction unit 12*b* can cause the display unit 20 to display an instruction message about a particular movement, a visual symbol that moves as an animation with a particular movement, or the like, for example, as the instruction display of a particular movement. A visual symbol may be, for example, a face icon that is an icon imitating a face, a pictogram, or the like.

A particular movement instructed by the movement instruction unit 12*b* may be, for example, a movement of shaking the head laterally or vertically, a movement of turning the head around, or the like, while not particularly limited. When a movement of shaking the head is instructed as a particular movement, the movement instruction unit 12*b* can cause the display unit 20 to display an instruction message "Please shake your head" or cause the display unit 20 to display a face icon that shakes the head in an animation movement, for example.

Further, the movement instruction unit 12*b* can function as a display control unit that controls and changes the display providing an instruction about a particular movement on the display unit 20, which is display directed to the user, in accordance with the movement state of the user in motion captured by the capture unit 22. For example, the movement instruction unit 12*b* can control and change the display providing the instruction about a particular movement on the display unit 20 in accordance with a determination result by the face image acquisition unit 12*c* as to whether or not a particular movement of the user is proper as described below.

For example, specifically, when providing an instruction about a movement of shaking the head as a particular movement, the movement instruction unit 12*b* controls and changes the display providing the instruction about a particular movement in the following manner, for example.

When it is determined by the face image acquisition unit 12*c* that the user's movement of shaking the head is proper, the movement instruction unit 12*b* may stop the face icon's movement of shaking the head displayed on the display unit 20, for example. Further, when it is determined to be proper, the movement instruction unit 12*b* may change the face icon display so as to have an affirmative facial expression associating that the user's particular movement is proper, for example.

On the other hand, when it is determined by the face image acquisition unit 12*c* that the user's movement of shaking the head is improper, the movement instruction unit 12*b* can continue the face icon's movement of shaking the head displayed on the display unit 20 or change the face icon's movement of shaking the head to a wider movement. Further, when it is determined to be improper, the movement instruction unit 12*b* may also change the face icon display to so as to have a negative facial expression associating that the user's particular movement is improper, for example. Further, when it is determined to be improper, the movement instruction unit 12*b* may cause the display unit 20 to emphasize and display an instruction message "Please shake your head" or may cause the display unit 20 to display an instruction message "Please shake your head widely."

As discussed above, when it is determined that a user's particular movement is proper, the movement instruction unit 12*b* can control and change the display providing the instruction about a particular movement so as to indicate that the user's particular movement is proper. Further, when it is determined that a user's particular movement is improper, the movement instruction unit 12*b* can control and change the display providing the instruction of a particular movement so as to indicate that the user's particular movement is improper.

Further, the movement instruction unit 12*b* may instruct the user about a particular movement by outputting a voice of a movement instruction from the audio output unit 24 in addition to or instead of the display of movement instruction display on the display unit 20. In such a case, the movement instruction unit 12*b* can output a voice uttering an instruction message providing an instruction about a particular movement, such as "Please shake your head", from the audio output unit 24.

The face image acquisition unit 12*c* is an information acquisition unit that acquires a face image that is biometrics information on the user from a moving image captured by the capture unit 22. The face image acquisition unit 12*c* operates as below to acquire a face image.

The face image acquisition unit 12*c* determines whether or not a particular movement regarding the user's head in a moving image captured by the capture unit 22 is proper. When the user's particular movement is a movement which can be used in impersonation determination to acquire a plurality of face images that can be used for estimate a three-dimensional shape of a user's head, the face image acquisition unit 12*c* determines that the user's particular movement is proper. On the other hand, when the user's particular movement is a movement from which such a plurality of face images are unable to be acquired, the face image acquisition unit 12*c* determines that the user's particular movement is improper. For example, when face images of multiple viewpoints are substantially unable to be acquired because the user's movement is too small, when the user's face has not been captured by the capture unit 22, or the like, it is not possible to acquire a plurality of face images that can be used for estimate a three-dimensional shape of the user's face. Therefore, in these cases, the face image acquisition unit 12*c* determines that the user's particular movement is improper.

Note that the face image acquisition unit 12*c* may determine that the user's movement is proper even when a particular movement instructed by the movement instruction unit 12*b* and the user's movement are not the same. For example, even when the user shakes the head vertically while the movement instruction unit 12*b* displays an animation of shaking the head laterally, the user's movement may be a movement which can be used in impersonation determination to acquire a plurality of face images that can be used for estimating the three-dimensional shape of the user's face. In such a case, the face image acquisition unit 12*c* can determine that the user's movement is proper.

In response to determining that the user's particular movement is proper, the face image acquisition unit 12*c* detects a face image of the user in a moving image captured by the capture unit 22. Furthermore, the face image acquisition unit 12*c* acquires a face image of the detected user as face information on the user. At this time, the face image acquisition unit 12*c* evaluates the quality of the detected face image and acquires a high quality face image having a quality above a predetermined quality. For example, the face image acquisition unit 12*c* can evaluate the quality of a face image based on a quality value calculated for each of a predetermined number of face feature points preset for estimating a three-dimensional shape of a face. The face image acquisition unit 12*c* is not necessarily required to acquire a face image itself but may extract and acquire a feature amount from a face image as face information.

The face image acquisition unit 12*c* repeatedly acquires a face image of the user as described above until a time limit, which is a predetermined time period from the time when a particular movement is instructed by the movement instruction unit 12*b*, has elapsed. Thereby, the face image acquisition unit 12*c* attempts acquisition of a predefined number of face images necessary for impersonation determination. Note that the time limit used in acquiring face images is preset in accordance with required accuracy of impersonation determination, a time period required to complete authentication, or the like, for example. Further, the predefined number of face images necessary for impersonation determination is preset in accordance with required accuracy of impersonation determination, a time period required to complete authentication, or the like, for example.

Further, the face image acquisition unit 12*c* functions as a display control unit that causes the display unit 20 to display the progress status of acquisition of face images as display in accordance with the movement status of the user. The face image acquisition unit 12*c* can cause the display unit 20 to display an acquisition rate of face images in percentage, which is a ratio of the number of acquired face images to the predefined number required for impersonation determination, for example, as the progress status of acquisition of face images in accordance with the movement status of the user. The face image acquisition unit 12*c* may display the acquisition rate of face images as a numerical value in a form of percentage expression or may display an acquisition rate of face images by using a gage or a progress bar whose length changes in accordance with the acquisition ratio of face images, for example. The shape of a gage or a progress bar indicating an acquisition ratio of face images is not particularly limited, and a bar-like shape, a ring-like shape, or a frame-like shape may be employed, for example. The face image acquisition unit 12*c* controls and changes the display indicating the progress status of acquisition of face images, which is display directed to the user, in accordance with the acquisition status of face images. The face image acquisition unit 12*c* can cause the display unit 20 to display the display indicating the progress status of acquisition of face images, such as a gage, a progress bar, or the like, in accordance with the user's movement status. Note that a form of display indicating the progress status of acquisition of face images is not limited to a gage or a progress bar, and various forms of display may be employed.

When the time limit elapses without the predefined number of face images being acquired by the face image acquisition unit 12*c* and thus acquisition of the predetermined number of face images fails, that is, when a predetermined amount of biometrics information is not acquired within a predetermined time period, the information provide unit 12*d* provides guidance information to the user. The guidance information is information that may be a reference, a guide, a help, or the like for successful acquisition of the predefined number of face images by the face image acquisition unit 12*c* when face authentication is again performed. The information provide unit 12*d* can cause the display unit 20 to display and provide guidance information to the user, for example. Further, the information provide unit 12*d* may output guidance information by using a voice from the audio output unit 24 and provide the guidance information to the user, for example.

The information provide unit 12*d* can provide, to the user, guidance information in accordance with a reason for being unable to acquire a face image by the face image acquisition unit 12*c*. For example, when a face image is unable to be acquired because of an improper movement of the user, the information provide unit 12*d* can provide guidance information regarding a user's particular movement. Further, for example, when a face image is unable to be acquired because of an improper authentication environment that is an environment where face authentication is performed, the information provide unit 12*d* can provide guidance information regarding an authentication environment. Further, it is possible to provide, to the user, guidance information regarding a user's particular movement and guidance information regarding an authentication environment in combination.

The information provide unit 12*d* can provide, as guidance information regarding a user's particular movement, guidance information that guides the user to perform a proper particular movement. For example, for the user instructed to perform a head shaking movement as a particular movement, the information provide unit 12*d* can display a guidance message regarding a head shaking movement on the display unit 20 or output a guidance message by using a voice from the audio output unit 24 as guidance information. In such a case, guidance message may be "Please shake your head widely", "Please shake your head slowly", "Motion is too fast", or the like.

Further, the information provide unit 12*d* can provide guidance information that guides the user to perform face authentication in a proper authentication environment as guidance information regarding authentication environment. An authentication environment where guidance information may be provided is not particularly limited and may correspond to brightness of an authentication place that is a place where authentication is performed, a capturing distance that is a distance at which the user is captured by the capture unit 22, or the like, for example.

For example, when a face image above a certain quality is unable to be acquired by the face image acquisition unit 12*c* because of an excessively bright or excessively dark authentication place, the information provide unit 12*d* can provide guidance information regarding brightness of the authentication place as guidance information. In such a case, the information provide unit 12*d* can display a guidance message such as "it is too bright", "it is too dark", or the like on the display unit 20 or output the guidance message as a voice from the audio output unit 24, for example, as guidance information.

Further, for example, when a face image above a certain quality is unable to be acquired by the face image acquisition unit 12*c* because of an excessively long or excessively short capturing distance by the capture unit 22, the information provide unit 12*d* can provide guidance information regarding a capturing distance by the capture unit 22. In such a case, the information provide unit 12*d* can display a guidance message such as "it is too far", "it is too close", or the like on the display unit 20 or output the guidance message as a voice from the audio output unit 24, for example, as guidance information.

Note that the information provide unit 12*d* can provide guidance information by causing the display unit 20 to display a visual symbol associating the content of a guidance message instead of or in addition to the guidance message. A visual symbol may be, for example, an icon, a pictogram, or the like.

The impersonation determination unit 12*e* performs impersonation determination based on a plurality of face images acquired by the face image acquisition unit 12*c*. In impersonation determination, the impersonation determination unit 12*e* determines whether or not the user's face is impersonated by a non-living object such as a photograph, a moving image, or the like.

The impersonation determination unit 12*e* estimates a three-dimensional shape of the user's face based on a plurality of face images acquired by the face image acquisition unit 12*c* in impersonation determination. The plurality of face images acquired by the face image acquisition unit 12*c* are obtained when the face of the user performing a particular movement is captured by the capture unit 22 and thus are multi-viewpoint images captured from different viewpoints. The impersonation determination unit 12*e* estimates a three-dimensional shape of the user's face from a plurality of face images, which are multi-viewpoint images. A method of estimating the three-dimensional shape is not particularly limited, and various methods can be used. For example, the impersonation determination unit 12*e* can estimate a three-dimensional shape of a face image of the user from the plurality of face images acquired by the face image acquisition unit 12*c* by using a bundle adjustment method.

In estimation of a three-dimensional shape, the impersonation determination unit 12*e* can perform the following process, for example. That is, the impersonation determination unit 12*e* acquires face information indicating respective positions of a predetermined number of face feature points in a face image for each plurality of face images acquired by acquired by the face image acquisition unit 12*c*. The number of face feature points used for acquiring face information may be two or more, for example, which may be specifically ten face feature points at the right eye, the left eye, the nose, the center of the mouth, the right corner of the mouth, the left corner of the mouth, the right cheek, the left cheek, the right side of the chin, and the left side of the chin. Furthermore, the impersonation determination unit 12*e* associates each of the predetermined number of face feature points between a plurality of face images based on respective pieces of face information of the acquired plurality of face images. The impersonation determination unit 12*e* can estimate a three-dimensional shape of the user's face based on a result of association of face feature points. According to such a process, each of a predetermined number of face feature points can be uniquely associated between a plurality of face images based on each face information of the plurality of face images. No complex process is required for this association. It is therefore possible to perform the association of face feature points between the plurality of face images more easily and more accurately, and it is possible to estimate a three-dimensional shape more easily and more accurately.

The impersonation determination unit 12*e* determines whether or not the user's face is impersonated by a non-living object such as a photograph, a moving image, or the like by evaluating the three-dimensional shape of the estimated user's face. For example, the impersonation determination unit 12*e* can determine whether or not there is impersonation by evaluating whether or not the estimated three-dimensional shape is three-dimensional, that is, whether the estimated three-dimensional shape is three-dimensional or two-dimensional. In such a case, the impersonation determination unit 12*e* can evaluate whether the three-dimensional shape is three-dimensional or two-dimensional by determining a relationship between an evaluation amount regarding the estimated three-dimensional shape and a preset threshold. As an evaluation amount, a distance, an angle, or the like associated with a particular face feature point or an amount based thereon may be used, for example, without being particularly limited. Note that, as a method of evaluating whether a three-dimensional shape is three-dimensional or two-dimensional, various methods may be used without being particularly limited.

When the impersonation determination unit 12*e* evaluates that the estimated three-dimensional shape of a face is three-dimensional, the impersonation determination unit 12*e* determines that the user's face is a face of a living body and is not impersonated. On the other hand, when the impersonation determination unit 12*e* evaluates that the estimated three-dimensional shape is two-dimensional, the impersonation determination unit 12*e* determines that the user's face is impersonated by a non-living object such as a photograph, a moving image, or the like.

The face recognition unit 12*f* performs face recognition based on one or a plurality of face images acquired by the face image acquisition unit 12*c*. In face recognition, the face recognition unit 12*f* compares a target face image, which is a face image of the user captured by the capture unit 22 and acquired by the face image acquisition unit 12*c*, with a registered face image, which is a pre-registered face image of the user, and determines whether or not both face images are matched. For example, the face recognition unit 12*f* can use a face image having the highest quality, such as a face image in which the user faces front, as a target face image out of a plurality of face images acquired by the face image acquisition unit 12*c* and compare the target face image with a registered face image. Further, the face recognition unit 12*f* may perform comparison between each of the plurality of face images and a registered face image. Note that the registered face image, which is registered biometrics information on the user, is pre-stored and registered in the storage unit 16, for example.

In comparison between both face images, the face recognition unit 12*f* can calculate a matching score indicating the similarity between a feature amount of a target face image and a feature amount of a registered face image. The higher the similarity between feature amounts of both face images is, the larger the matching score is. When comparison with a registered face image is performed for each of the plurality of face images, the average value, the maximum value, or the like of matching score values calculated in respective comparisons may be used as a matching score. When the matching score is greater than or equal to a predetermined threshold, the face recognition unit 12*f* can determine that there is a matching in the comparison between a target face image and a registered face image, that is, there is a matching in the face recognition. On the other hand, when the matching score is less than a predetermined threshold, the face recognition unit 12*f* can determine that there is no matching in the comparison between a target face image and a registered face image, that is, there is no matching in the face recognition.

Note that, at the time before a predefined number of face images are acquired by the face image acquisition unit 12*c*, the face recognition unit 12*f* can use an already acquired face image as a target face image and compare that target face image with a registered face image in the same manner as described above. In such a case, at the time when it is determined by the face recognition unit 12*f* that there is no matching in comparison, the face image acquisition unit 12*c* can stop acquisition of face images even before a predefined number of face images are acquired.

Note that some or all of the functions of respective units of the CPU 12 described above are not necessarily required to be implemented in the CPU 12 of the information processing apparatus 10 that is a single apparatus but may be implemented by other external apparatuses such as a server. For example, the functions of the impersonation determination unit 12*e*, the face recognition unit 12*f*, or the like of the functions of respective units of the CPU 12 described above may be implemented by a CPU of a server communicably coupled to the information processing apparatus 10 via a network. In such a case, the CPU 12 of the information processing apparatus 10 transmits a process request from the function of the impersonation determination unit 12*e*, the face recognition unit 12*f*, or the like to the server via the network together with data such as a face image, a feature amount extracted from a face image, or the like necessary for the requested process. Further, the CPU 12 receives a process result obtained by the function of the impersonation determination unit 12*e*, the face recognition unit 12*f*, or the like from the server via the network.

The storage unit 16 is formed of a storage medium such as a nonvolatile memory, such as a flash memory, a hard disk drive, or the like. The storage unit 16 stores a program such as a particular application program executed by the CPU 12, data referenced by the CPU 12 in executing the program, or the like. For example, the storage unit 16 stores a face image of the user acquired from an image captured by the capture unit 22. Further, the storage unit 16 stores a registered face image of the user used in face recognition, for example.

The input unit 18 accepts user input of information, an instruction, or the like to the information processing apparatus 10. The user may input various information or input an instruction to perform a process into the information processing apparatus 10 via the input unit 18. The input unit 18 is formed of a touchscreen embedded in the display unit 20, for example. Note that the input unit 18 may be formed of a keyboard, a mouse, or the like, for example.

The display unit 20 displays various windows such as an execution window of a particular application program under the control of the CPU 12. For example, an execution window of a particular application program includes a login window, a face authentication window, a window after login, or the like. For example, the display unit 20 is formed of a liquid crystal display, an organic light emitting diode (OLED) display, or the like and configured as a touchscreen display together with the input unit 18.

The capture unit 22 captures an image including a face of the user who performs face authentication. For example, the capture unit 22 is formed of a digital camera that can capture a moving image and acquires two-dimensional image forming a moving image at a predetermined framerate.

The communication unit 26 transmits and receives data to and from an external apparatus such as a server via a network under the control of the CPU 12. The communication standard, the communication scheme, or the like of the communication unit 26 is not particularly limited and may be a wireless scheme or a wired scheme.

In such a way, the information processing apparatus 10 according to the present example embodiment is configured.

In the information processing apparatus 10 according to the present example embodiment, the movement instruction unit 12*b* controls and changes the display providing an instruction about a particular movement on the display unit 20 in accordance with the movement status of the user during a movement captured by the capture unit 22. This enables the user to determine whether or not his/her movement responding to an instruction of a particular movement is proper and appropriately correct his/her movement. Further, the face image acquisition unit 12*c* causes the display unit 20 to display the progress status of acquisition of face images. The user is able to also use the progress status of acquisition of face images as a material for determining whether or not his/her movement is proper. Therefore, according to the information processing apparatus 10 of the present example embodiment, it is possible to cause the user to move properly in accordance with an instruction of a particular movement, and a face image that is biometrics information necessary for determination of impersonation can be acquired properly based on the user's movement.

Further, in the information processing apparatus 10 according to the present example embodiment, the information provide unit 12*d* provides guidance information when acquisition of a predefined number of face images by the face image acquisition unit 12*c* fails. Therefore, according to the information processing apparatus 10 of the present example embodiment, it is possible to cause the user to act so that the predefined number of face images can be acquired by the face image acquisition unit 12*c* when the user again performs face authentication.

Figure 2:
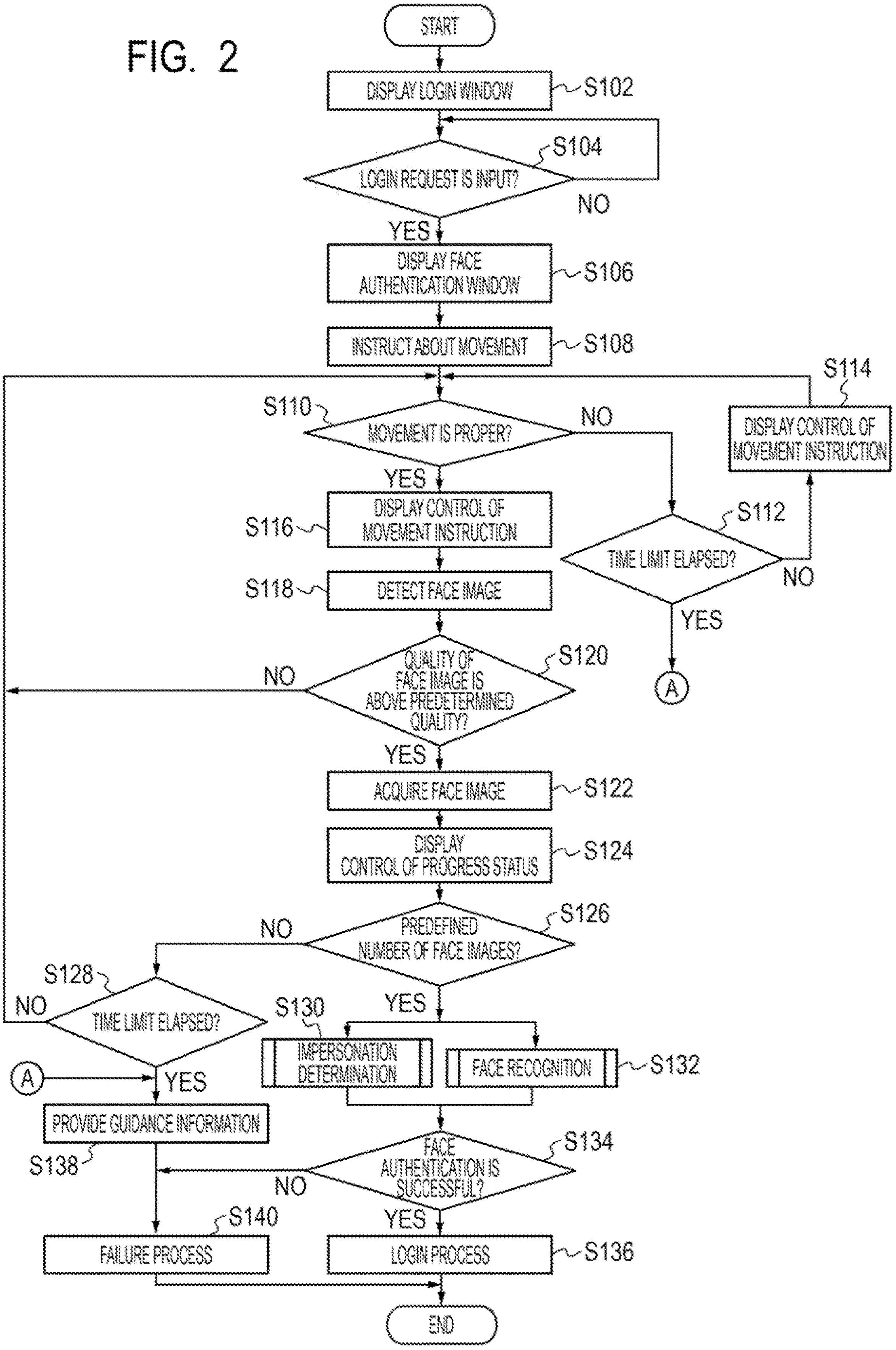
FIG. 2 is a flowchart illustrating an operation of face authentication of the information processing apparatus according to the first example embodiment of the present invention.
Figure 3:
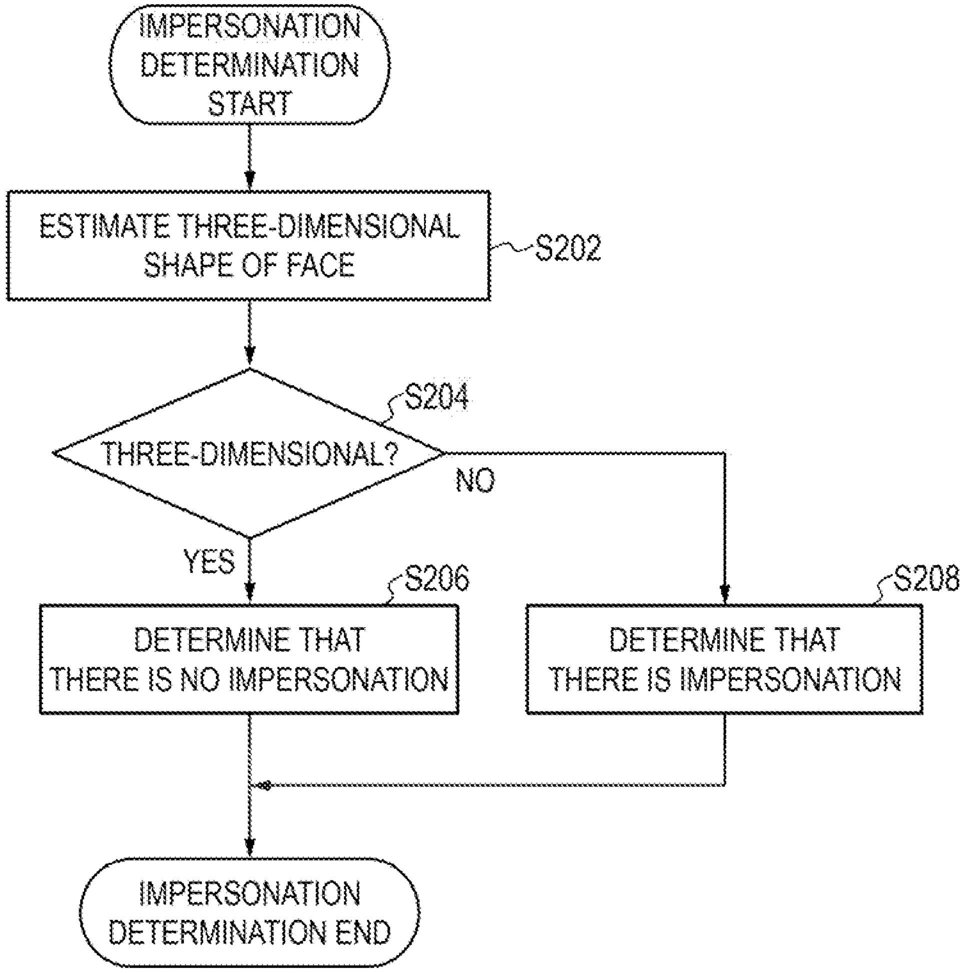
FIG. 3 is a flowchart illustrating an operation of impersonation determination in the information processing apparatus according to the first example embodiment of the present invention.
Figure 4:
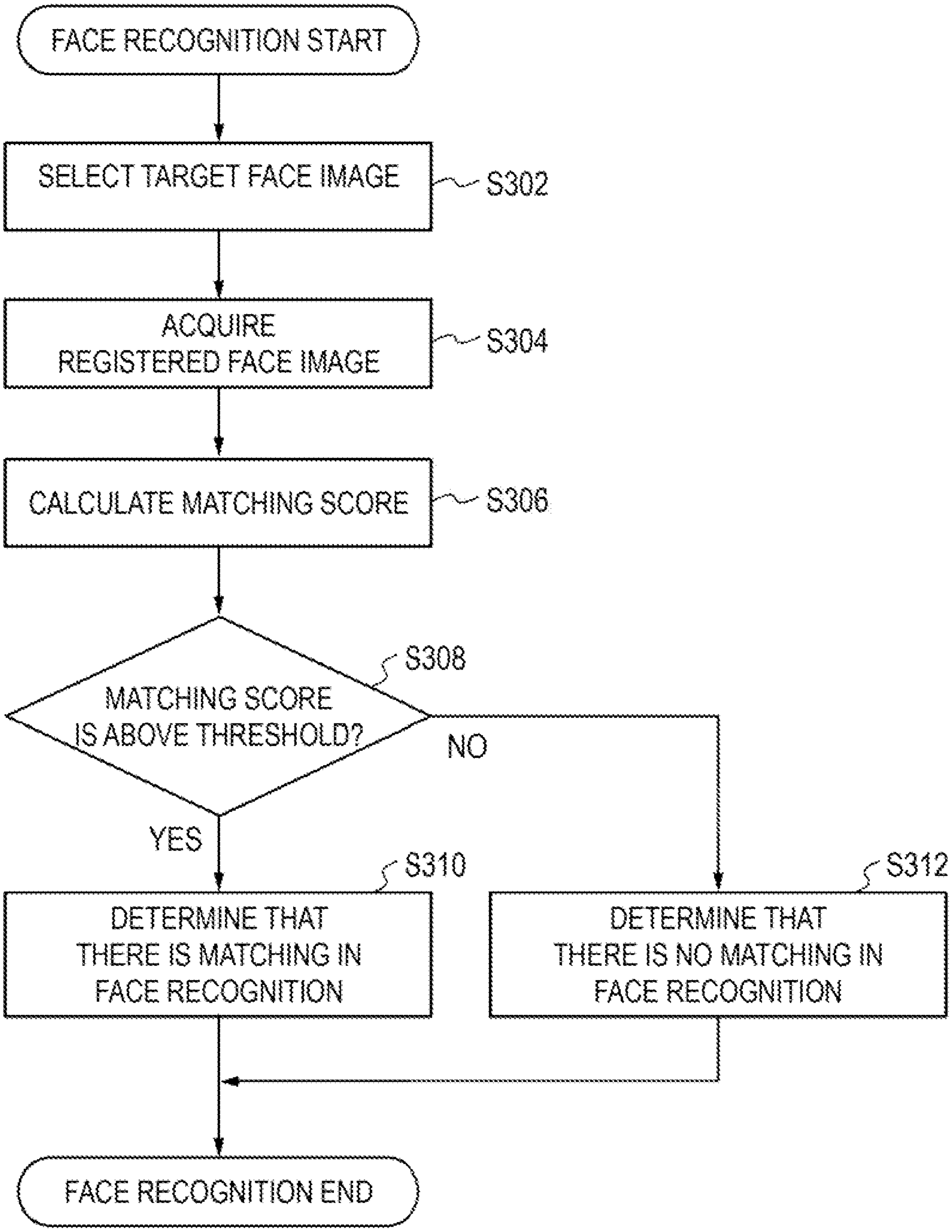
FIG. 4 is a flowchart illustrating an operation of face recognition in the information processing apparatus according to the first example embodiment of the present invention.

The operation of face authentication in the information processing apparatus 10 according to the present example embodiment will be further described below by using FIG. 2 to FIG. 10. FIG. 2 is a flowchart illustrating the operation of face authentication in the information processing apparatus 10. FIG. 3 is a flowchart illustrating the operation of impersonation determination in the information processing apparatus 10. FIG. 4 is a flowchart illustrating the operation of face recognition in the information processing apparatus 10. FIG. 5 to FIG. 10 are schematic diagrams illustrating examples of a series of windows on the display unit 20 during a face authentication operation in the information processing apparatus 10, respectively. In response to the operation of face authentication in the information processing apparatus 10 being performed, an information processing method according to the present example embodiment is performed.

First, when a particular application program is executed by the CPU 12, the authentication processing unit 12*a* causes the display unit 20 to display a login window that requests face authentication from the user and accepts a login request of the user as illustrated in FIG. 2 (step S102).

Figure 5:
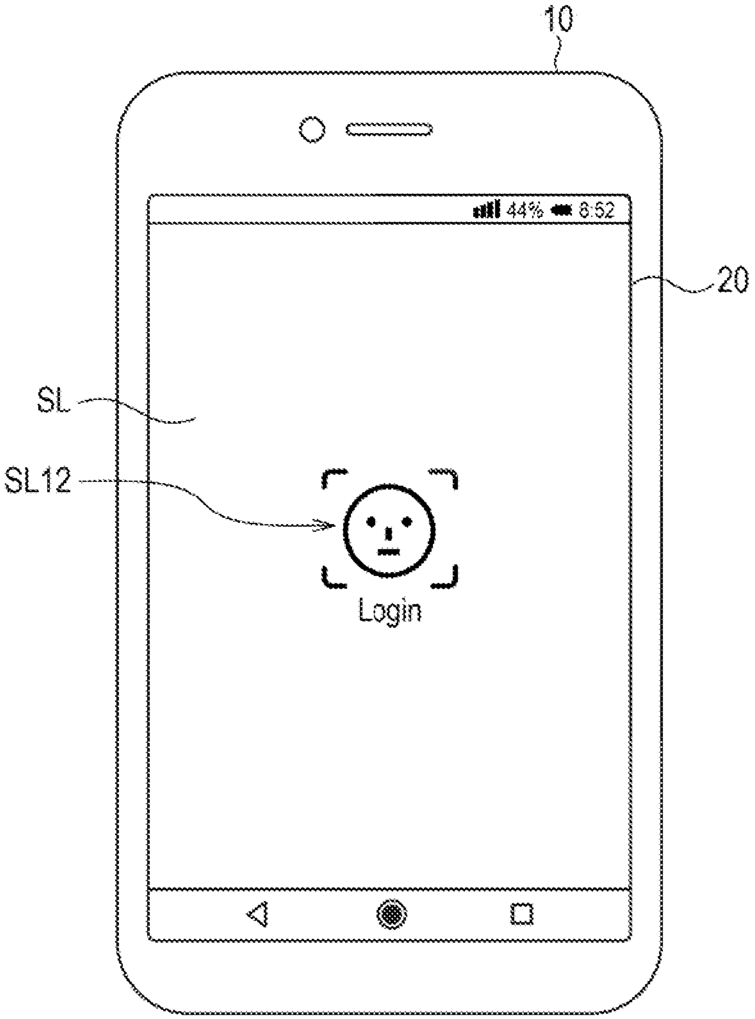
FIG. 5 is a schematic diagram illustrating one example of a login window in the information processing apparatus according to the first example embodiment of the present invention.

FIG. 5 illustrates one example of a login window SL that requests face authentication. As illustrated in FIG. 5, on the login window SL, a face icon SL12 indicating that face authentication is requested in a login operation is displayed. For example, by pushing the face icon SL12, the user may input, to the information processing apparatus 10, a login request that requests login to a particular application program.

The authentication processing unit 12*a* continuously determines whether or not a login request is input by the user (step S104) and stands by until a login request is input (step S104, NO).

In response to determining that a login request is input (step S104, YES), the authentication processing unit 12*a* causes the display unit 20 to display a face authentication window used for performing face authentication (step S106).

Figure 6:
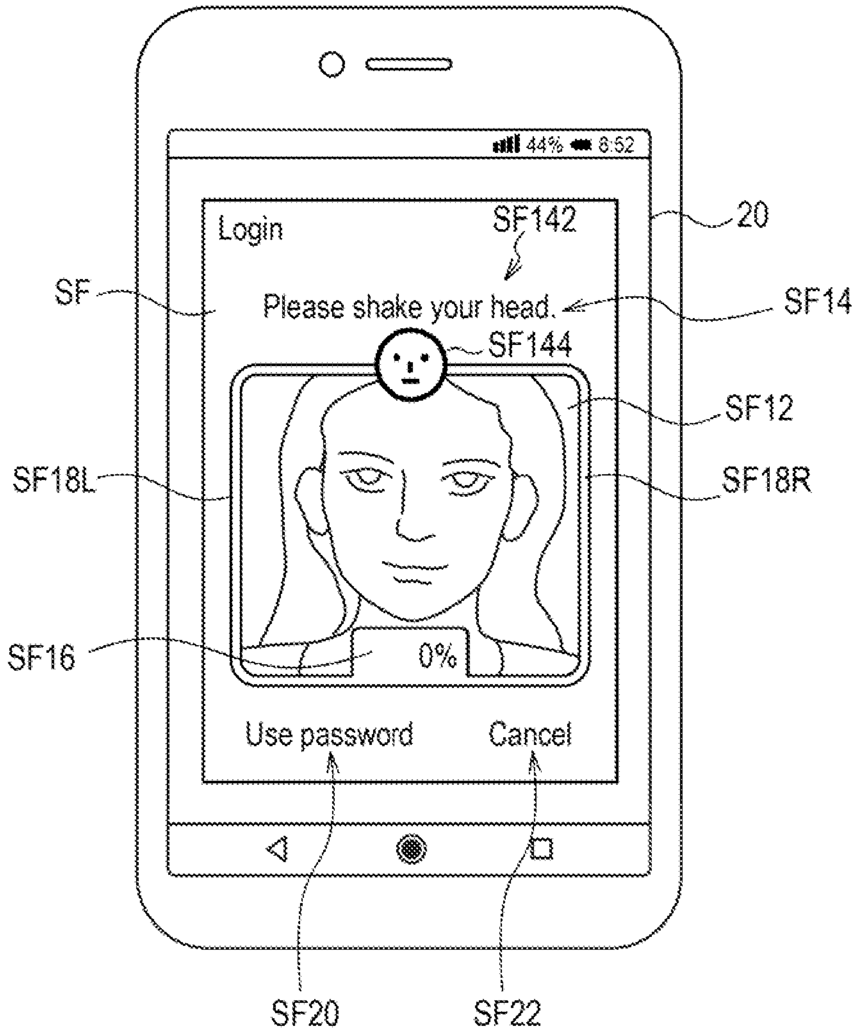
FIG. 6 is a schematic diagram illustrating a face authentication window at the start of acquisition of face images in the information processing apparatus according to the first example embodiment of the present invention.

FIG. 6 illustrates one example of a face authentication window SF at the start of face authentication, that is, at the start of acquisition of a face image by the face image acquisition unit 12*c*. As illustrated in FIG. 6, the face authentication window SF includes a moving image display region SF12 that displays a moving image captured by the capture unit 22 and a movement instruction display region SF14 that displays an instruction about a particular movement from the movement instruction unit 12*b*. Further, the face authentication window SF includes a bar-like gage SF16 indicating the progress status of acquisition of face images and frame-like gages SF18L and SF18R similarly indicating the progress status of acquisition of face images. Further, the face authentication window SF includes a "Use password" button SF20 used for switching the authentication scheme to a password scheme and a "Cancel" button SF22 used for cancelling face authentication.

The moving image display region SF12 displays, in substantially real time, a moving image including a face of the user captured by the capture unit 22. The user is able to determine whether or not his/her movement to the instruction of a particular movement from the movement instruction unit 12*b* is proper by checking the moving image of his/her face displayed in the moving image display region SF12.

The movement instruction display region SF14 displays an instruction message SF142 providing an instruction about a particular movement and a face icon SF144 similarly providing an instruction about a particular movement. The instruction message SF142 indicates the content of a particular movement instructed by the movement instruction unit 12*b*. Further, the face icon SF144 moves as an animation with a particular movement instructed by the movement instruction unit 12*b*. The movement instruction unit 12*b* instructs the user about a particular movement by using the instruction message SF142 such as "Please shake your head", for example. Further, the movement instruction unit 12*b* instructs the user about a particular movement by using the face icon SF144 that shakes the head as an animation movement, for example.

The bar-like gage SF16 changes the length thereof in accordance with the progress status of acquisition of face images performed by the face image acquisition unit 12*c*. Specifically, the bar-like gage SF16 changes the length thereof so as to extend from the left to the right in accordance with an acquisition rate of face images performed by the face image acquisition unit 12*c*. Further, inside the bar-like gage SF16, the acquisition rate of face images is displayed as a numerical value in a form of percentage representation.

The frame-like gages SF18L and SF18R are arranged so as to form the left half frame portion and the right half frame portion around the moving image display region SF12, respectively. The frame-like gages SF18L and SF18R changes the lengths thereof in accordance with the progress status of acquisition of face images performed by the face image acquisition unit 12*c*, respectively, in a similar manner to the bar-like gage SF16. Specifically, the frame-like gages SF18L and SF18R change the lengths thereof so as to extend from the bottom to the top in accordance with the acquisition rate of face images performed by the face image acquisition unit 12*c*, respectively.

On the frame surrounding the moving image display region SF12 formed of the frame-like gages SF18L and SF18R, the face icon SF144 is arranged at the center on the upper side, and the bar-like gage SF16 is arranged at the center on the lower side. The frame-like gages SF18L and SF18R indicate an acquisition rate of face images of 0% at the center of the bar-like gage SF16 and indicate an acquisition rate of face images of 100% at the reaching point at the face icon SF144, respectively.

The "Use password" button SF20 is a button used for switching the authentication scheme used for login to a particular application program from a face authentication scheme to a password scheme. The user is able to switch the authentication scheme used for login to a password scheme which requires entry of a password by pushing the "Use password" button SF20.

The "Cancel" button SF22 is a button used for cancelling face authentication used for login to a particular application program. The user is able to cancel face authentication by pushing the "Cancel" button SF22.

Once the face authentication window is displayed, as illustrated in FIG. 2, the movement instruction unit 12*b* causes the display unit 20 to display an instruction message, which provides an instruction about a particular movement, and a face icon, which moves as an animation with a particular movement, in the face authentication window and instructs the user about the particular movement (step S108). The movement instruction unit 12*b* can provide an instruction about a movement of shaking the head by using an instruction message, a face icon, or the like, for example.

Once the user is instructed by the movement instruction unit 12*b* to perform a particular movement, the face image acquisition unit 12*c* attempts acquisition of a predefined number of user's face images necessary for impersonation determination until the time limit elapses.

First, the face image acquisition unit 12*c* determines whether or not a user's particular movement in the moving image captured by the capture unit 22 is proper (step S110).

If it is determined by the face image acquisition unit 12*c* that the user's particular movement is improper (step S110, NO), unless the time limit has elapsed (step S112, NO), the movement instruction unit 12*b* controls and changes the display providing an instruction about a particular movement (step S114). In this case, the movement instruction unit 12*b* may continue the movement of the face icon shaking the head, may cause the movement of the face icon shaking the head to be wider, or may emphasize and display an instruction message "Please shake your head" on the display unit 20, for example. The face image acquisition unit 12*c* then continues to determine whether or not the user's particular movement is proper (step S110). Note that, if the time limit has elapsed (step S112, YES), the process proceeds to step S138 described below.

On the other hand, if it is determined by the face image acquisition unit 12*c* that the user's particular movement is proper (step S110, YES), the movement instruction unit 12*b* controls and changes the display providing the instruction about a particular movement (step S116). In this case, the movement instruction unit 12*b* may stop the movement of the face icon shaking the head or may change display of the face icon so as to have a smiling facial expression or the like which associates that the user's particular movement is proper, for example.

If the face image acquisition unit 12*c* determines that the user's particular movement is proper (step S110, YES), the face image acquisition unit 12*c* detects a face image of the user in the moving image captured by the capture unit 22 (step S118).

Next, the face image acquisition unit 12*c* evaluates the quality of the detected face image (step S120). If the face image acquisition unit 12*c* determines that the quality of the face image is not above a predetermined quality (step S120, NO), the process proceeds to step S110 described above to again attempt acquisition of face images.

On the other hand, if the face image acquisition unit 12*c* determines that the quality of the face image is above a predetermined quality (step S120, YES), the face image acquisition unit 12*c* acquires a high quality face image having a quality above the predetermined quality (step S122).

In response to acquiring face images, the face image acquisition unit 12*c* controls and changes the display indicating the progress status of acquisition of face images, such as a gage, a progress bar, a numerical value in a form of percentage indicating an acquisition rate of face images, or the like (step S124).

Figure 7:
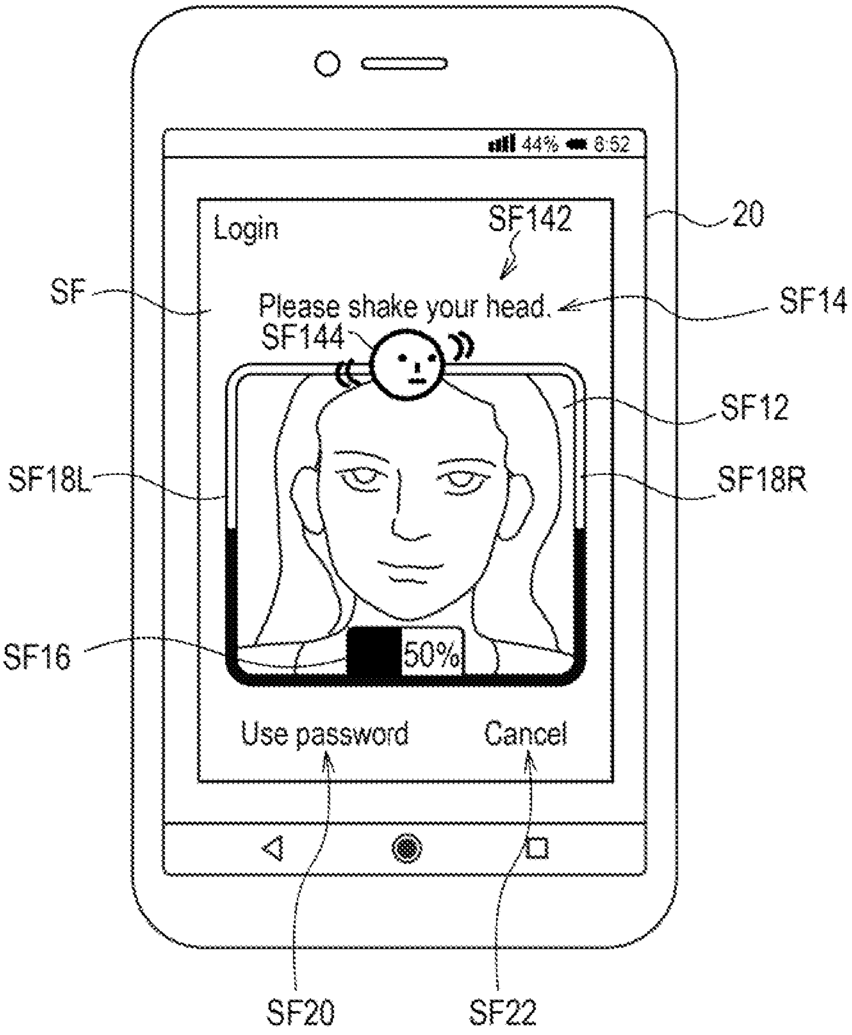
FIG. 7 is a schematic diagram illustrating one example of a face authentication window during acquisition of face images in the information processing apparatus according to the first example embodiment of the present invention.

FIG. 7 illustrates one example of the face authentication window SF when face images are being acquired by the face image acquisition unit 12*c*. Note that FIG. 7 illustrates the face authentication window SF when the acquisition rate of face images is 50%. In the face authentication window SF during acquisition of face images, the bar-like gage SF16 extends from the left to the right, and the frame-like gages SF18L and SF18R extend from the bottom to the top as the number of acquired face images increases, as illustrated in FIG. 7. Further, the numerical value of the acquisition rate of face images inside the bar-like gage SF16 increases as the number of acquired face images increases.

Next, as illustrated in FIG. 2, the face image acquisition unit 12*c* determines whether or not a predefined number of face images necessary for impersonation determination is acquired (step S126). If the face image acquisition unit 12*c* determines that the predefined number of face images have not been acquired (step S126, NO), unless the time limit has elapsed (step S128, NO), the face image acquisition unit 12*c* enters step S110 described above to again attempt acquisition of face images. Note that, if the time limit has elapsed (step S128, YES), the process proceeds to step S138 described later.

On the other hand, if the face image acquisition unit 12*c* determines that the predefined number of face images have been acquired (step S126, YES), the impersonation determination unit 12*e* performs impersonation determination (step S130), and the face recognition unit 12*f* performs face recognition (step S132). Note that any one of the impersonation determination by the impersonation determination unit 12*e* and the face recognition by the face recognition unit 12*f* may be performed earlier than the other and may be performed in parallel. Further, the face recognition unit 12*f* can perform face recognition by using already acquired face images at the time before the predefined number of face images are acquired by the face image acquisition unit 12*c*.

Figure 8:
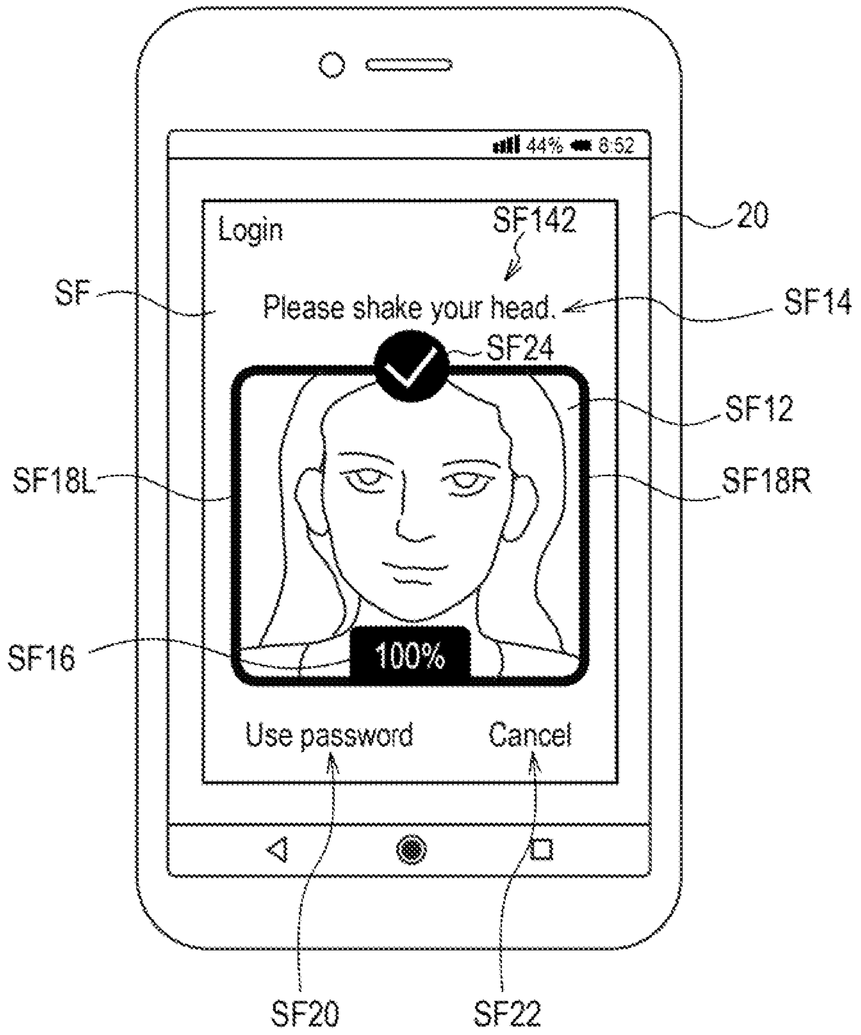
FIG. 8 is a schematic diagram illustrating one example of a face authentication window at the completion of acquisition of face images in the information processing apparatus according to the first example embodiment of the present invention.

Note that FIG. 8 illustrates one example of the face authentication window SF at completion of acquisition of the predefined number of face images performed by the face image acquisition unit 12*c*. As illustrated in FIG. 8, in the face authentication window SF at the completion of acquisition of face images, the bar-like gage SF16 and the frame-like gages SF18L and SF18R have extended at the maximum, respectively. Further, the acquisition ratio of face images inside the bar-like gage SF16 is 100%. Further, in the face authentication window SF at the completion of acquisition of face images, a completion icon SF24 indicating the completion of acquisition of face images is displayed instead of the face icon SF144, and the completion of the process is visually indicated to the user.

The impersonation determination unit 12*e* first estimates a three-dimensional shape of the user's face based on a plurality of face images acquired by the face image acquisition unit 12*c* as illustrated in FIG. 3 (step S202).

Next, the impersonation determination unit 12*e* evaluates whether or not the estimated three-dimensional shape is three-dimensional (step S204).

If the impersonation determination unit 12*e* evaluates that the estimated three-dimensional shape is three-dimensional (step S204, YES), the impersonation determination unit 12*e* determines that the user's face is a face of a living body and is not impersonated (step S206).

On the other hand, if the impersonation determination unit 12*e* evaluates that the estimated three-dimensional shape is not three-dimensional, that is, is two-dimensional (step S204, NO), the impersonation determination unit 12*e* determines that the user's face is impersonated by a photograph, a moving image, or the like (step S208).

On the other hand, the face recognition unit 12*f* first selects a target face image used for comparison with a registered face image from the plurality of face images acquired by the face image acquisition unit 12*c*, as illustrated in FIG. 4 (step S302).

Further, the face recognition unit 12*f* reads and acquires a registered face image to be compared with the target face image from the storage unit 16 or the like (step S304).

Next, the face recognition unit 12*f* calculates a matching score indicating the similarity between a feature amount of the target face image and a feature amount of the registered face image (step S306).

Next, the face recognition unit 12*f* determines whether or not the calculated matching score is greater than or equal to a predetermined threshold (step S308).

If the face recognition unit 12*f* determines that the matching score is greater than or equal to a predetermined threshold (step S308, YES), the face recognition unit 12*f* determines that there is a matching in the comparison between the target face image and the registered face image, that is, there is a matching in the face recognition (step S310).

On the other hand, if the face recognition unit 12*f* determines that the matching score is less than the predetermined threshold (step S308, NO), the face recognition unit 12*f* determines that there is no matching in the comparison between the target face image and the registered face image, that is, there is no matching in the face recognition (step S312).

Note that the face recognition unit 12*f* may perform the process illustrated in FIG. 4 using already acquired face images even at the time before the predefined number of face images are acquired by the face image acquisition unit 12*c*.

Next, as illustrated in FIG. 2, the authentication processing unit 12*a* determines whether or not face authentication of the user is successful based on a result of the impersonation determination performed by the impersonation determination unit 12*e* and a result of the face recognition performed by the face recognition unit 12*f* (step S134).

If the authentication processing unit 12*a* determines that the face authentication of the user is successful (step S134, YES), the authentication processing unit 12*a* permits the user to log in a particular application program and performs a login process to allow the user to log in (step S136). The authentication processing unit 12*a* performs the login process and causes the display unit 20 to display a window after login of the particular application. The authentication processing unit 12*a* determines that the face authentication is successful if it is determined by the impersonation determination unit 12*e* that there is no impersonation (step S206) and it is determined by the face recognition unit 12*f* that there is a matching in the face recognition (step S310).

Figure 9:
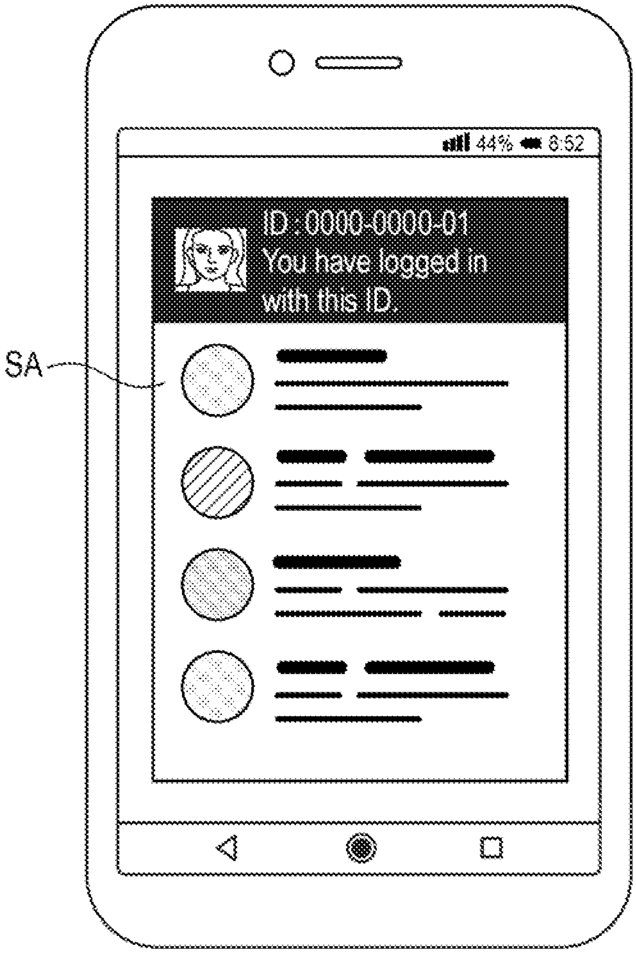
FIG. 9 is a schematic diagram illustrating one example of a window after face authentication succeeds and login is completed in the information processing apparatus according to the first example embodiment of the present invention.

FIG. 9 is illustrated as a window after login SA of a particular application after face authentication succeeded. As illustrated in FIG. 9, the window after login SA is a window of the particular application logged in by the user.

On the other hand, if the authentication processing unit 12*a* determines that the face authentication of the user failed (step S134, NO), the authentication processing unit 12*a* rejects login of the user to the particular application program. If it is determined by the impersonation determination unit 12*e* that there is impersonation (step S208) or if it is determined by the face recognition unit 12*f* that there is no matching in the face recognition (step S312), the authentication processing unit 12*a* determines that the face authentication failed. In this case, the authentication processing unit 12*a* performs a failure process such as a process that notifies the user that the face authentication failed (step S140).

As described above, unlike the case where the predefined number of face images are acquired by the face image acquisition unit 12*c* and face authentication is performed, face authentication may fail as a result that the predefined number of face images were not obtained and the time limit has elapsed (step S112, YES or step S128, YES). In these cases, the information provide unit 12*d* provides guidance information regarding a user's particular movement or an authentication environment in accordance with a reason for the face images being unable to be acquired by the face image acquisition unit 12*c* (step S138). For example, the information provide unit 12*d* can display guidance information on the display unit 20 or output a voice from the audio output unit 24 to provide the guidance information to the user. Thereby, it is possible to improve the probability of the predefined number of face images being acquired by the face image acquisition unit 12*c* within the time limit when face authentication is again performed.

Next, the authentication processing unit 12*a* performs a failure process such as a process to notify the user that the face authentication failed (step S140).

Figure 10:
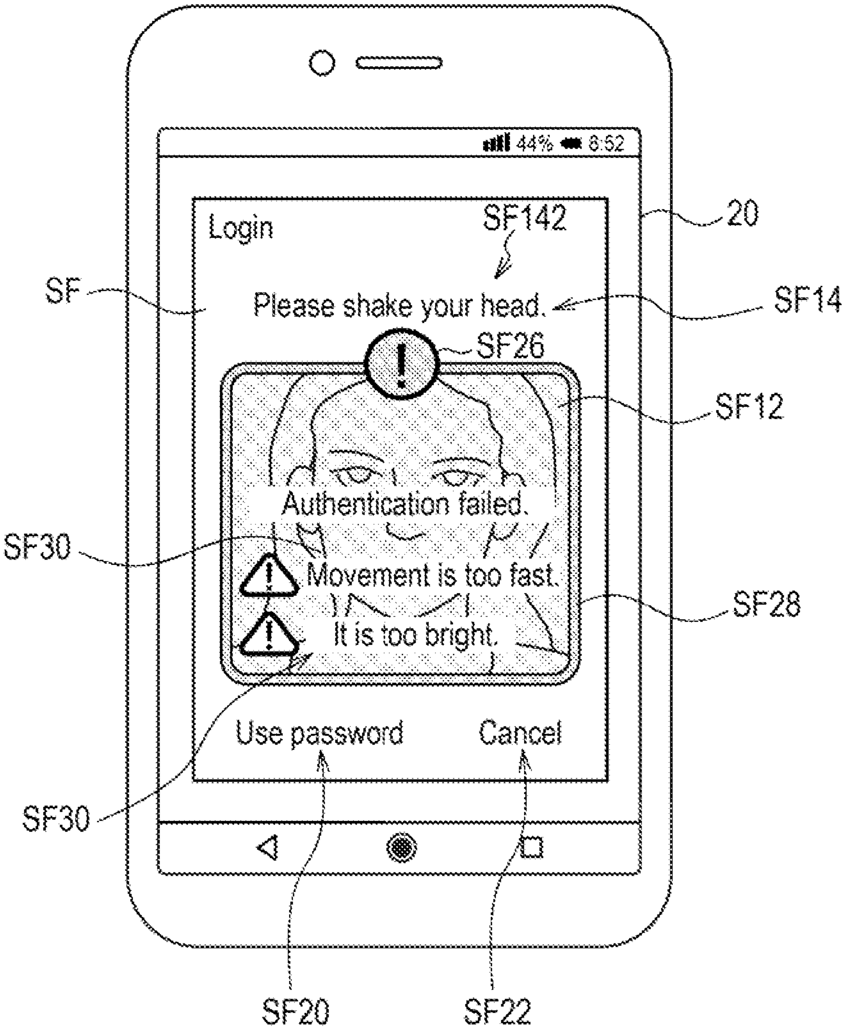
FIG. 10 is a schematic diagram illustrating one example of a face authentication window when face authentication fails in the information processing apparatus according to the first example embodiment of the present invention.

FIG. 10 illustrates the face authentication window SF at a face authentication failure when the face authentication failed because the predefined number of face images have not been acquired and the time limit has elapsed. As illustrated in FIG. 10, in the face authentication window SF at the face authentication failure, a failure icon SF26 such as an exclamation mark icon indicating that the predefined number of face images have not been acquired and thus the face authentication failed is displayed instead of the face icon SF144. Further, instead of the frame-like gages SF18L and SF18R, a failure frame SF28 indicating that the face authentication failed by using a different color or the like from the frame-like gages SF18L and SF18R is displayed around the moving image display region SF12, for example. Further, while displaying a color moving image captured by the capture unit 22 when face images are acquired, the moving image display region SF12 displays a grayscale frame or a black and white frame at a particular point of time of a moving image captured by the capture unit 22 when face authentication fails, for example. Thereby, the moving image display region SF12 indicates that face authentication failed.

Furthermore, in the moving image display region SF12, a guidance message SF30 is displayed as guidance information provided by the information provide unit 12*d*. For example, the guidance message SF30 is a message having the content in accordance with a reason for a failure in acquisition of the predefined number of face images, such as "Motion is too fast", "It is too bright", or the like.

In such a way, face authentication is performed for the user by the information processing apparatus 10 according to the present example embodiment.

As discussed above, according to the present example embodiment, display providing an instruction about a particular movement on the display unit 20 is controlled and changed, and the progress status of acquisition of face images is displayed on the display unit 20 in accordance with the movement status of the user in the movement captured by the capture unit 22. Therefore, according to the present example embodiment, a face image that is biometrics information necessary for impersonation determination can be properly acquired based on a user's movement.

Second Example Embodiment

Figure 11:
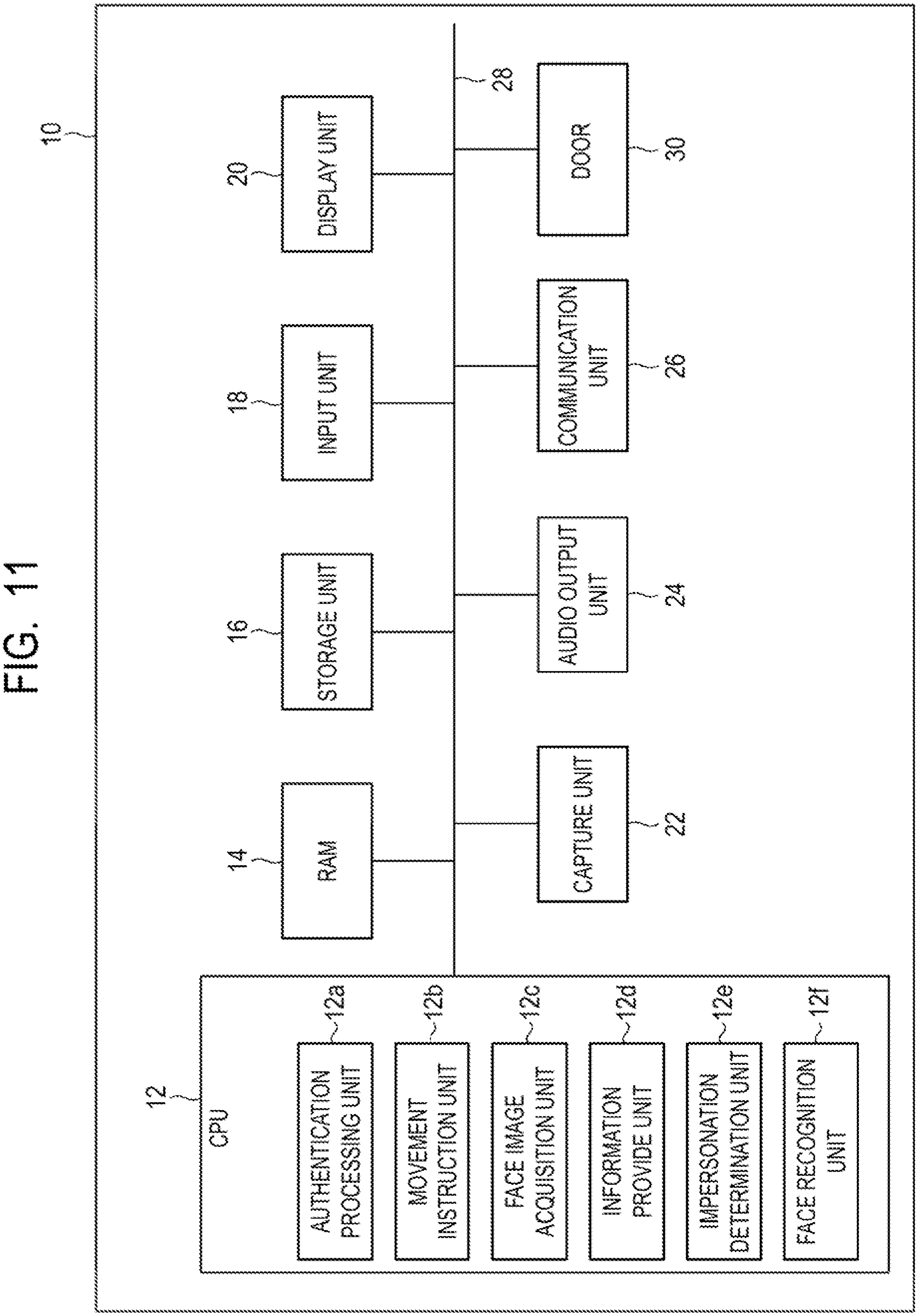
FIG. 11 is a block diagram illustrating a configuration of an information processing apparatus according to a second example embodiment of the present invention.

An information processing apparatus according to a second example embodiment of the present invention will be described by using FIG. 11. FIG. 11 is a block diagram illustrating a configuration of the information processing apparatus according to the present example embodiment. Note that the same components as those in the first example embodiment described above are labeled with the same references, and the description thereof will be omitted or simplified.

While the case where the information processing apparatus 10 is configured to perform face authentication at login to a particular application has been described in the first example embodiment described above, the invention is not limited thereto. For example, face authentication may be performed at entry to a particular place such as a room, an area, or the like. In the present example embodiment, a case where an information processing apparatus is configured as a control apparatus that controls a door such as an automatic door, a gate, or the like to restrict entry to a particular place and performs face authentication at entry to the particular place will be described.

As illustrated in FIG. 11, an information processing apparatus 210 according to the present example embodiment has a door 30 that restricts entry to a particular place in addition to the configuration of the information processing apparatus 10 according to the first example embodiment illustrated in FIG. 1.

The door 30 is formed of an automatic door, a security gate, or the like, for example, and installed at an entrance of a particular place such as a room, an area, or the like where entry of the user is restricted. The door 30 performs a door-open operation and a door-close operation under the control of the CPU 12.

The information processing apparatus 210 according to the present example embodiment performs the same face authentication as in the information processing apparatus 10 according to the first example embodiment described above when the user enters a particular place where entry is restricted by the door 30. That is, the information processing apparatus 210 according to the present example embodiment opens the door 30 when face authentication is successful and permits entry of the user to a particular place. On the other hand, the information processing apparatus 210 maintains the door 30 to be closed when face authentication fails and rejects entry of the user to a particular place.

As with the present example embodiment, the information processing apparatus can be configured to perform the same face authentication as the first example embodiment at entry to a particular place.

Further, in addition to the above, face authentication may be performed at login to a server from a user terminal, for example. Accordingly, the information processing apparatus can be configured as a server that accepts login from a user terminal via a network, and face authentication can be performed at login from the user terminal. In such a case, an information processing apparatus configured as a server may have the configuration that functions as the CPU 12, the RAM 14, and the storage unit 16 that are the same as those of the first example embodiment. The user terminal may have the configuration that functions as the input unit 18, the display unit 20, the capture unit 22, and the audio output unit 24 that are the same as those of the first example embodiment, for example.

As discussed above, an information processing apparatus can be configured to perform the same face authentication as that in the first example embodiment in various scenes that require authentication.

Another Example Embodiment

Figure 12:
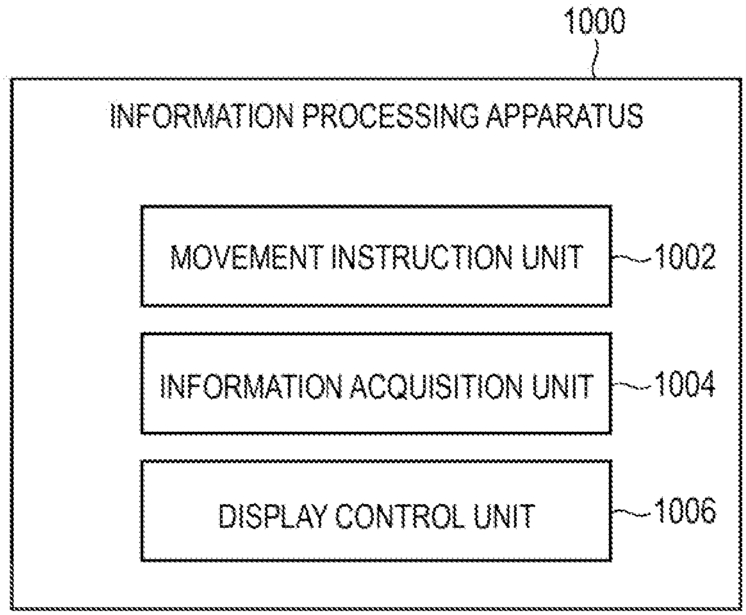
FIG. 12 is a block diagram illustrating a configuration of an information processing apparatus according another example embodiment of the present invention.

The information processing apparatus described in the above example embodiments may be configured as illustrated in FIG. 12 according to another example embodiment. FIG. 12 is a block diagram illustrating the configuration of the information processing apparatus according to another example embodiment.

As illustrated in FIG. 12, an information processing apparatus 1000 according to another example embodiment has a movement instruction unit 1002 that instructs the user about a movement and an information acquisition unit 1004 that acquires biometrics information on the user from the user instructed about the movement. Further, the information processing apparatus 1000 has a display control unit 1006 that controls display directed to the user in accordance with the movement status of the user.

According to another example embodiment, display directed to the user is controlled in accordance with the movement status of the user. Thereby, according to another example embodiment, necessary biometrics information can be suitably acquired based on the user's movement.

Modified Example Embodiment

The present invention is not limited to the example embodiments described above, and various modifications are possible.

For example, while the case where a plurality of face images are acquired as biometrics information used for impersonation determination has been described as an example in the above example embodiments, the invention is not limited thereto. As biometrics information, a gait image, a fingerprint image, an iris image, a finger vein image, a palm image, a palm vein image, or the like may be acquired other than a face image. Biometrics authentication may be performed by using biometrics information acquired from a user instructed to perform a particular movement instead of face authentication using a face image as biometrics information.

Further, while the case where face images acquired as biometrics information is used to perform impersonation determination and face recognition has been described as an example in the above example embodiments, the invention is not limited thereto. The acquired biometrics information such as a face image can be utilized for various purposes.

Further, the information processing apparatuses 10 and 210 according to the example embodiments described above may be configured as a system including one or a plurality of apparatuses.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, a floppy (registered trademark) disk, a hard disk, an optical disk, a magneto-optical disk, a compact disk-read only memory (CD-ROM), a magnetic tape, a non-volatile memory card, or a ROM, for example, may be used. Further, the scope of each example embodiment includes not only those executing a process with a program itself stored in the storage medium but also those operating on an operating system (OS) in cooperation with the function of another software or an extension board to execute the process.

Services realized by the function of each example embodiment described above can be provided to the user in a form of Software as a Service (SaaS).

An example advantage according to the invention is that necessary biometrics information can be suitably acquired based on a user's movement.

The whole or part of the example embodiments disclosed above can be described as, but not limited to, the following supplementary notes.

Supplementary Note 1

An information processing apparatus comprising:
- a movement instruction unit that instructs a user about a movement;
- an information acquisition unit that acquires biometrics information on the user from the user instructed about the movement; and
- a display control unit that controls display directed to the user in accordance with a movement status of the user.

Supplementary Note 2

The information processing apparatus according to supplementary note 1,
- wherein the movement instruction unit indicates the movement by causing a display unit to display the display that instructs the user about the movement, and
- wherein the display control unit controls the display that instructs the user about the movement in accordance with the movement status of the user.

Supplementary Note 3

The information processing apparatus according to supplementary note 1 or 2, wherein the display control unit causes a display unit to display the display indicating progress status of acquisition of the biometrics information in accordance with the movement status of the user.

Supplementary Note 4

The information processing apparatus according to any one of supplementary notes 1 to 3 further comprising an information provide unit that provides guidance information when the information acquisition unit is unable to acquire a predetermined amount of the biometrics information within a predetermined time period.

Supplementary Note 5

The information processing apparatus according to supplementary note 4, wherein the guidance information is information regarding a movement or an environment of the user.

Supplementary Note 6

The information processing apparatus according to any one of supplementary notes 1 to 5,
- wherein the movement instruction unit instructs the user about the movement related to a head of the user, and
- wherein the information acquisition unit acquires multiple pieces of face information as the biometrics information from the user.

Supplementary Note 7

The information processing apparatus according to any one of supplementary notes 1 to 6 further comprising an impersonation determination unit that determines, based on the biometrics information, whether or not the user is impersonated.

Supplementary Note 8

The information processing apparatus according to supplementary note 7 further comprising a comparison unit that compares the biometrics information acquired by the information acquisition unit with registered biometrics information.

Supplementary Note 9

The information processing apparatus according to supplementary note 8, wherein the information acquisition unit stops acquisition of the biometrics information when there is no matching in comparison performed by the comparison unit.

Supplementary Note 10

The information processing apparatus according to supplementary note 8 or 9 further comprising an authentication processing unit that performs authentication on the user based on a result of determination performed by the impersonation determination unit and a result of comparison performed by the comparison unit.

Supplementary Note 11

An information processing method comprising:

instructing a user about a movement;

acquiring biometrics information on the user from the user instructed about the movement; and controlling display directed to the user in accordance with a movement status of the user.

Supplementary Note 12

A non-transitory storage medium storing a program that causes a computer to perform:

instructing a user about a movement;

acquiring biometrics information on the user from the user instructed about the movement; and controlling display directed to the user in accordance with a movement status of the user.

While the present invention has been described with reference to the example embodiments, the present invention is not limited to the example embodiment described above. Various modification that can be understood by those skilled in the art can be made to the configuration or the details of the present invention within the scope of the present invention.

What is claimed is:

1. An imaging method comprising:

controlling display of an instruction to a user to capture a plurality of images of the user;

controlling acquisition of a plurality of images;

determining, for each of the plurality of acquired images, whether the respective one of the plurality of acquired images satisfies a predetermined quality for user authentication;

based on the determining, classifying the plurality of acquired images into:

(i) one or more images that satisfy the predetermined quality; and (ii) one or more images that do not satisfy the predetermined quality;

controlling display of the plurality of acquired images such that each image determined to satisfy the predetermined quality is displayed in color, and each image determined not to satisfy the predetermined quality is displayed in grayscale or monochrome;

controlling display of a first circular mark having a first circle and partially overlapping the one or more images that satisfy the predetermined quality, the first circular mark including, inside the first circle, a symbol indicating that the predetermined quality is satisfied; and controlling display of a second circular mark having a second circle and partially overlapping the one or more images that do not satisfy the predetermined quality, the second circular mark including, inside the second circle, a symbol indicating that the predetermined quality is not satisfied, wherein the one or more images determined to satisfy the predetermined quality are used for authenticating the user.

2. The imaging method according to claim 1, further comprising controlling display of guidance for acquiring images of the predetermined quality.

3. The imaging method according to claim 1, further comprising controlling display of guidance corresponding to a reason why the at least one of the acquired images does not satisfy the predetermined quality.

4. The imaging method according to claim 3, further comprising controlling display of both the at least one of the acquired images that does not satisfy the predetermined quality and guidance corresponding to a reason why the at least one of the acquired images does not satisfy the predetermined quality.

5. The imaging method according to claim 3, wherein the guidance includes information related to an acquiring environment in a case where the at least one of the acquired images does not satisfy the predetermined quality due to an insufficient acquiring environment.

6. The imaging method according to claim 3, further comprising controlling display of a visual symbol related to the guidance.

7. The imaging method according to claim 2, further comprising controlling change guidance based on a reason why the at least one of the acquired images does not satisfy the predetermined quality.

8. The imaging method according to claim 2, further comprising controlling display of, at a position above at least a portion of the at least one of the acquired images, failure information indicating failure to acquire the at least one image that does not satisfy the predetermined quality.

9. The imaging method according to claim 8, further comprising controlling display of a cancel button at a position below the at least one of the acquired images.

10. The imaging method according to claim 2, further comprising controlling display of, in a case where at least one of the acquired images does not satisfy the predetermined quality within a predetermined time, the at least one of the acquired images that does not satisfy the predetermined quality within the predetermined time.

11. A non-transitory computer-readable storage medium storing a program for causing a computer to execute operations comprising:

controlling display of an instruction to a user to capture a plurality of images of the user;

controlling acquisition of a plurality of images;

determining, for each of the plurality of acquired images, whether the respective one of the plurality of acquired images satisfies a predetermined quality for user authentication;

based on the determining, classifying the plurality of acquired images into:

(i) one or more images that satisfy the predetermined quality; and (ii) one or more images that do not satisfy the predetermined quality;

controlling display of the plurality of acquired images such that each image determined to satisfy the predetermined quality is displayed in color, and each image determined not to satisfy the predetermined quality is displayed in grayscale or monochrome;

controlling display of a first circular mark having a first circle and partially overlapping the one or more images that satisfy the predetermined quality, the first circular mark including, inside the first circle, a symbol indicating that the predetermined quality is satisfied; and controlling display of a second circular mark having a second circle and partially overlapping the one or more images that do not satisfy the predetermined quality, the second circular mark including, inside the second circle, a symbol indicating that the predetermined quality is not satisfied, wherein the one or more images determined to satisfy the predetermined quality are used for authenticating the user.

12. The non-transitory computer-readable storage medium according to claim 11, wherein the operations further comprise controlling display of guidance for acquiring images of the predetermined quality.

13. The non-transitory computer-readable storage medium according to claim 11, wherein the operations further comprise controlling display of guidance corresponding to a reason why the at least one of the acquired images does not satisfy the predetermined quality.

14. The non-transitory computer-readable storage medium according to claim 13, wherein the operations further comprise controlling display of both the at least one of the acquired images that does not satisfy the predetermined quality and guidance corresponding to a reason why the at least one of the acquired images does not satisfy the predetermined quality.

15. The non-transitory computer-readable storage medium according to claim 13, wherein the guidance includes information related to an acquiring environment in a case where the at least one of the acquired images does not satisfy the predetermined quality due to an insufficient acquiring environment.

16. The non-transitory computer-readable storage medium according to claim 13, wherein the operations further comprise controlling display of a visual symbol related to the guidance.

17. The non-transitory computer-readable storage medium according to claim 11, wherein the operations further comprise controlling change guidance based on a reason why the at least one of the acquired images does not satisfy the predetermined quality.

18. The non-transitory computer-readable storage medium according to claim 11, wherein the operations further comprise controlling display of, at a position above at least a portion of the at least one of the acquired images, failure information indicating failure to acquire the at least one image that does not satisfy the predetermined quality.

19. The non-transitory computer-readable storage medium according to claim 17, wherein the operations further comprise controlling display of a cancel button at a position below the at least one of the acquired images.

20. An imaging device comprising:

at least one memory storing instructions; and at least one processor configured to execute the instructions to execute operations comprising:

controlling display of an instruction to the user to capture a plurality of images of the user;

controlling acquisition of a plurality of images;

determining, for each of the plurality of acquired images, whether the respective one of the plurality of acquired images satisfies a predetermined quality for user authentication;

based on the determining, classifying the plurality of acquired images into:

(i) one or more images that satisfy the predetermined quality; and (ii) one or more images that do not satisfy the predetermined quality;

controlling display of the plurality of acquired images such that each image determined to satisfy the predetermined quality is displayed in color, and each image determined not to satisfy the predetermined quality is displayed in grayscale or monochrome;

controlling display of a first circular mark having a first circle and partially overlapping the one or more images that satisfy the predetermined quality, the first circular mark including, inside the first circle, a symbol indicating that the predetermined quality is satisfied; and controlling display of a second circular mark having a second circle and partially overlapping the one or more images that do not satisfy the predetermined quality, the second circular mark including, inside the second circle, a symbol indicating that the predetermined quality is not satisfied, wherein the one or more images determined to satisfy the predetermined quality are used for authenticating the user.

21. The imaging method according to claim 3, wherein the first circular mark partially overlapping and partially not overlapping the image satisfies the predetermined quality, and wherein the second circular mark partially overlapping and partially not overlapping the image does not satisfy the predetermined quality.

* * * * *